United States Patent
Park

(10) Patent No.: US 11,127,149 B2
(45) Date of Patent: Sep. 21, 2021

(54) IMAGE ANALYSIS METHOD AND APPARATUS, AND COMPUTER READABLE DEVICE

(71) Applicant: Sang-Rae Park, Seoul (KR)

(72) Inventor: Sang-Rae Park, Seoul (KR)

(*) Notice: Subject to any disclaimer, the term of this patent is extended or adjusted under 35 U.S.C. 154(b) by 268 days.

(21) Appl. No.: 15/514,653

(22) PCT Filed: Dec. 11, 2015

(86) PCT No.: PCT/KR2015/013585
§ 371 (c)(1),
(2) Date: Mar. 27, 2017

(87) PCT Pub. No.: WO2016/108472
PCT Pub. Date: Jul. 7, 2016

(65) Prior Publication Data
US 2017/0213356 A1    Jul. 27, 2017

(30) Foreign Application Priority Data

Dec. 31, 2014   (KR) .................. 10-2014-0194755

(51) Int. Cl.
*G06T 7/60* (2017.01)
*G06K 9/46* (2006.01)
(Continued)

(52) U.S. Cl.
CPC .................. *G06T 7/60* (2013.01); *G06K 9/46* (2013.01); *G06K 9/4604* (2013.01);
(Continued)

(58) Field of Classification Search
None
See application file for complete search history.

(56) References Cited

U.S. PATENT DOCUMENTS

| 5,870,140 A * | 2/1999 | Gillberry | G01D 5/39 348/160 |
| 7,570,281 B1 * | 8/2009 | Ono | G06T 7/11 348/135 |

(Continued)

FOREIGN PATENT DOCUMENTS

| JP | 2007-323667 A | 12/2007 |
| JP | 2010-205121 A | 9/2010 |

(Continued)

OTHER PUBLICATIONS

Korean Office Action dated Feb. 6, 2015 in corresponding Korean Patent Application No. 10-2014-0194755 (5 pages in Korean).

*Primary Examiner* — Frederick D Bailey
(74) *Attorney, Agent, or Firm* — NSIP Law

(57) ABSTRACT

The image analysis method may comprise the steps of: measuring a distance between a subject and an image analysis apparatus; outputting an image obtained by photographing the subject; selecting at least two feature points in the image of the photographed subject on the basis of information on the output feature points; calculating the relative size of the pre-stored original image of the subject on the basis of the measured distance; extracting feature points in the pre-stored original image of the subject, which correspond to the at least two selected feature points, on the basis of the calculated relative size; and comparing the image of the photographed subject with the original image on the basis of the selected feature points and the extracted feature points.

23 Claims, 7 Drawing Sheets

(51) Int. Cl.
*G06T 7/00* (2017.01)
*G06K 9/62* (2006.01)
*G06K 9/00* (2006.01)

(52) U.S. Cl.
CPC .......... *G06K 9/6202* (2013.01); *G06K 9/6211* (2013.01); *G06T 7/001* (2013.01); *G06K 2009/0059* (2013.01); *G06K 2209/03* (2013.01)

(56) References Cited

U.S. PATENT DOCUMENTS

| | | | | |
|---|---|---|---|---|
| 9,342,752 | B1* | 5/2016 | Lee | H04N 7/15 |
| 2008/0013836 | A1* | 1/2008 | Nakamura | G06K 9/4642 |
| | | | | 382/209 |
| 2009/0252377 | A1* | 10/2009 | Akita | G06T 7/269 |
| | | | | 382/106 |
| 2010/0103311 | A1* | 4/2010 | Makii | H04N 5/23293 |
| | | | | 348/369 |
| 2010/0322590 | A1* | 12/2010 | Takehi | H04N 5/76 |
| | | | | 386/235 |
| 2011/0293166 | A1* | 12/2011 | Sinbar | G01N 21/3554 |
| | | | | 382/141 |
| 2012/0044499 | A1* | 2/2012 | Shimoyama | A61B 3/102 |
| | | | | 356/479 |
| 2013/0202160 | A1* | 8/2013 | Yoshizawa | G06K 9/00221 |
| | | | | 382/118 |
| 2014/0029806 | A1 | 1/2014 | Nihei et al. | |
| 2014/0267614 | A1* | 9/2014 | Ding | G06T 7/593 |
| | | | | 348/46 |
| 2015/0278598 | A1* | 10/2015 | Scott | G06K 9/00577 |
| | | | | 382/100 |
| 2016/0343126 | A1* | 11/2016 | Miller | G06T 7/0006 |

FOREIGN PATENT DOCUMENTS

| | | |
|---|---|---|
| JP | 2013-222406 A | 10/2013 |
| JP | 2014-27355 A | 2/2014 |
| KR | 10-2012-0013878 A | 2/2012 |

* cited by examiner

IMAGE ANALYSIS METHOD AND APPARATUS, AND COMPUTER READABLE DEVICE

CROSS REFERENCE TO RELATED APPLICATIONS

This application is the National Phase of PCT International Application No. PCT/KR2015/013585, filed on Dec. 11, 2015, which claims priority under 35 U.S.C. 119(a) to Patent Application No. 10-2014-0194755, filed in Republic of Korea on Dec. 31, 2014, all of which are hereby expressly incorporated by reference into the present application.

TECHNICAL FIELD

The present invention relates to image analysis, and more particularly, to a method and an apparatus for comparing a captured image with an original image to analyze the same and a computer-readable medium.

BACKGROUND ART

The present invention relates to a method and an apparatus for comparing a captured image with an original image to analyze the same.

Currently, as electronic engineering technology has advanced, various types of image processing methods have been developed. Also, due to development in digital imaging apparatuses, it becomes easy to capture images and to check and analyze captured images. In addition, as displays for displaying captured image data have developed, an additional developing process is not necessary for checking or analyzing images. In addition, since displays described above can store a large number of images at the same time, a user may display a plurality of images at the same time without inconvenience of replacing images.

Also, as image processing methods have advanced, methods for comparing two images or two digital image files with each other have been developed. In relation thereto, as a conventional technology, there is a method of comparing patterns disclosed in Korean Patent Application No. 10-2004-7015012. However, existing technologies have a problem in quickly comparing two or more images. That is, in existing methods of comparing images, since target images are divided and the divided images are mutually compared and digitized, there may be present a limitation in quickly and efficiently comparing images.

Furthermore, recently, as performance of equipment such as a printer, a scanner, a digital camera, product manufacturing equipment, and the like has improved, counterfeit and falsification technologies have been gradually developed. For example, in production of counterfeit goods of famous brands or forgery of valuable securities and the like, imitations that are too similar to genuine goods to distinguish with the naked eye are reproduced.

However, as described above, a large amount of time may be reduced in comparing two images or two digital image files. Particularly, for example, in the case of customs formalities at an airport, it is necessary to capture images of products inside a carrier of a passenger and quickly analyze the captured images to determine whether the products are genuine or counterfeit. Accordingly, a demand for a method of quickly and efficiently comparing two or more images is present in the art.

Additionally, an object imported from a foreign country is unloaded first at a designated shed and then a shipper who imports the object, a staff of the shed, and a customhouse staff inspect the number, type and the like of the unloaded object. Here, the shipper, the staff of the shed, and the customhouse staff carry general cameras, inspect the number and type of the object and whether origin thereof is indicated, and capture an image thereof. As a result of inspection, the origin is not indicated at the object, the customhouse staff requests a pre-repairing operation for indicating the origin from the shipper. In response to this, the pre-repairing operation is performed on the object with no indication of origin. However, there is an inconvenience in which all the shipper, the staff of the shed, and the customhouse staff have to move to the designated shed to inspect the type, number, and whether to pre-repair. Particularly, it is an inconvenience to the customhouse staff to directly move to the designated shed to inspect the object.

Additionally, an analog instrument or a digital instrument such as various pressure gages, magnetic level gages, electrical contact pressure gages and the like is installed at a factory, a ship, an airplane, gas supply facilities and the like for safety inspection. However, inspectors may manipulate an inspection result using an analog instrument or a digital instrument or give a false report or may omit a safety inspection using the analog instrument or the digital instrument. In this case, it is apprehended that a big accident may occur because a safety inspection is not transparently and quickly performed.

DISCLOSURE OF INVENTION

Technical Problem

It is an aspect of the present invention to provide an image analysis method, an apparatus, and a computer-readable medium for satisfying necessity in the art described above.

It is another aspect of the present invention to provide a method of quickly and efficiently comparing images.

It is still another aspect of the present invention to increase reliability of comparing images by modifying an original image or a captured image even when an image is captured while deviating from the original image.

It is yet another aspect of the present invention to digitize and quantify genuine/counterfeit determination using an automated image concordance determination technology.

It is even another aspect of the present invention to easily calculate a consumption rate of a product that is being used using a difference between images of a new product and the product that is being used.

It is a further aspect of the present invention to transparently and quickly perform a safety inspection through an analog instrument or a digital instrument using an automated image checking technology.

It is a still further aspect of the present invention to provide requesting and outputting of feature point information of an image of an object or an original image thereof stored in a database using an RFID tag, a barcode and the like.

Technical Solution

As described above, technical features of the present invention for achieving the aspects of the present invention and achieving characteristic effects of the present invention are as follows.

Disclosed is an image analysis method performed by an image analysis apparatus according to one embodiment of the present invention. The method may include measuring a distance between an object and the image analysis apparatus, outputting a captured image of the object, selecting at least two feature points in the captured image of the object based on information on output feature points of the captured image, calculating a relative size of an original image prestored with respect to the object based on the measured distance, extracting feature points in the original image prestored with respect to the object, corresponding to the selected at least two feature points, based on the calculated relative size, and comparing the captured image of the object with the original image based on the selected feature points and the extracted feature points. Here, the captured image of the object is output with information on at least two feature points predetermined with respect to the object that has been image-captured.

The captured image of the object may be output with information on at least two feature points predetermined with respect to the object that has been image-captured.

Disclosed is an image analysis apparatus according to one embodiment of the present invention. The image analysis apparatus may include a distance sensor configured to measure a distance between an object and the image analysis apparatus, an output unit configured to output a captured image of the object, a selection unit that selects at least two feature points in the captured image of the object based on information on output feature points of the captured image, and a control unit configured to calculate a relative size of an original image prestored with respect to the object based on the measured distance, extracts feature points in the original image prestored with respect to the object, corresponding to the selected at least two feature points based on the calculated relative size, and comparing the captured image of the object with the original image based on the selected feature points and the extracted feature points.

The output unit may be further configured to output information on at least two feature points predetermined with respect to the object that has been image-captured, with the captured image of the object.

Disclosed is an image analysis computer-readable medium according to one embodiment of the present invention. The computer-readable medium may store instructions for allowing a computer to perform following operations. The method may include measuring a distance between an object and the image analysis apparatus, outputting a captured image of the object, selecting at least two feature points in the captured image of the object based on information on output feature points of the captured image, calculating a relative size of an original image prestored with respect to the object based on the measured distance, extracting feature points in the original image prestored with respect to the object, corresponding to the selected at least two feature points, based on the calculated relative size, and comparing the captured image of the object with the original image based on the selected feature points and the extracted feature points.

In the outputting of the captured image of the object, the captured image of the object may be output with information on at least two feature points predetermined with respect to the object that has been image-captured.

Disclosed is a customhouse inspection system according to one embodiment of the present invention. The customhouse inspection system may include a smart camera for determining whether an object is genuine and a customhouse server for communicating with the smart camera through a wired or wireless network. Here, the smart camera may include a distance sensor configured to measure a distance between the object and the smart camera, an output unit configured to output a captured image of the object, a selection unit that selects at least two feature points in the captured image of the object based on information on output feature points of the captured image, and a transmission/reception unit configured to communicate with the customhouse server. The transmission/reception unit may be further configured to transmit information on the measured distance and information on the selected feature points to the customhouse server. Here, the output unit may be further configured to output information on at least two feature points predetermined with respect to the object that has been image-captured, with the captured image of the object. Also, the customhouse server may be configured to calculate a relative size of an original image prestored with respect to the object based on distance information received from the smart camera, extract feature points in the original image prestored with respect to the object, corresponding to the at least two feature points received from the smart camera, based on the calculated relative size, compare the captured image of the object with the original image based on the received feature points and the extracted feature points, and transmit comparison data obtained by the comparison to the smart camera.

Advantageous Effects

Through an image analysis method according to one aspect of the present invention, images may be more quickly compared.

In addition, through the image analysis method according to one aspect of the present invention, even when an image is captured while deviating from an original image, reliability of comparing images may be increased by modifying the original image or the captured image.

Additionally, through the image analysis method according to one aspect of the present invention, genuine/counterfeit determination may be digitized and quantified by an automated image concordance determined technology.

Also, through the image analysis method according to one aspect of the present invention, a consumption rate of a product that is being used may be easily calculated using a difference between images of a new product and the product that is being used.

Also, through the image analysis method according to one aspect of the present invention, a safety inspection using an analog instrument or a digital instrument may be transparently and quickly performed using an automated image check technology.

BRIEF DESCRIPTION OF DRAWINGS

To allow features of the present disclosure described above to be understood through a more detailed description with reference to following embodiments, some of the embodiments are shown in the attached drawings. Also, like reference numerals in the drawings are intended to designate like or similar functions throughout various aspects. However, it should be appreciated that the attached drawings merely illustrate particular exemplary embodiments of the present disclosure and are not intended to limit the scope of the present invention and other embodiments having the same effects may be fully recognized.

BEST MODE FOR INVENTION

Various embodiments and/or aspects now will be described with reference to the drawings. Hereinafter, for description, a plurality of details will be described for comprehensive understanding of one or more aspects. However, it should be appreciated by one of ordinary skill in the art that the aspect(s) described above may be executed without the details. Particularly exemplary ones of the one or more aspects will be described in detail through the following description and the attached drawings. However, these aspects are merely examples, some of various methods in principles of various aspects may be used, and explanations that will be described are intended to include all the aspects and equivalents thereof.

In addition, the term "or" is intended not to have an exclusive meaning but to have an inclusive one. That is, unless defined otherwise or when not contextually definite, "X uses A or B" is intended to mean one of natural inclusive substitutes. That is, when X uses A; X uses B; or X uses both A and B, "X uses A or B" may be applied as any one of them. Also, it should be understood that the term "and/or" used herein refers to or includes any and all combinations of one or more of a plurality of associated listed items.

Also, it should be understood that the terms "comprise" and/or "comprising" specify the presence of stated features and/or components but do not preclude the presence or addition of one or more other features, components, and/or combinations thereof. Also, unless defined otherwise or when not definitely indicated as a singular form in the context, throughout the specification and the claims, it should be appreciated that a singular form generally means "one or more" forms.

Figure 1:
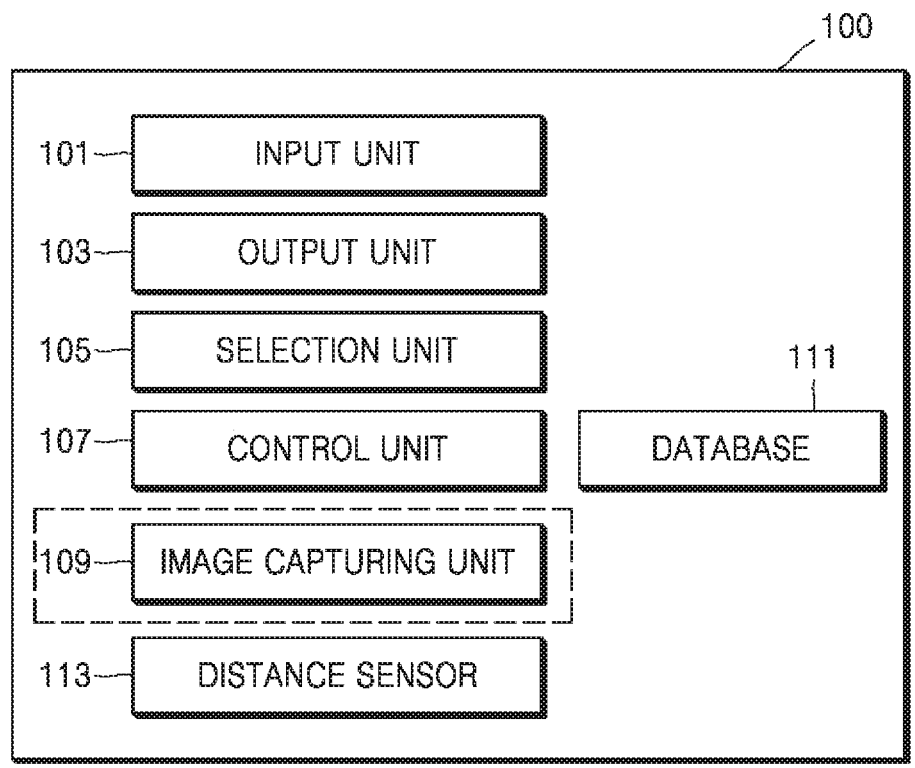
FIG. 1 illustrates components of an image analysis apparatus according to one embodiment of the present invention.

FIG. 1 illustrates components of an image analysis apparatus 100 according to one embodiment of the present invention.

As shown in FIG. 1, the image analysis apparatus 100 may include an input unit 101, an output unit 103, a selection unit 105, a control unit 107, an image capturing unit 109, a database 111, and a distance sensor 113. In one aspect of the present invention, other components in addition to the components shown in FIG. 1 or some of them may be included in the image analysis apparatus 100. In other words, since the components shown in FIG. 1 are not essential, the image analysis apparatus 100 may be provided as including more or less components than that.

Hereinafter, the components of the image analysis apparatus 100 will be sequentially described.

In the specification, the image analysis apparatus 100 may include a handheld apparatus and a computing apparatus having wireless or wired accessibility such as a smart camera, a digital camera, a mobile device, a mobile station, a mobile terminal, a user terminal, an access terminal, a wireless communication apparatus, a PC, a laptop, PDA and the like.

Referring to FIG. 1, the input unit 101 may receive inputs from the image analysis apparatus 100. For example, the input unit 101 may receive identification information with respect to a captured object. The identification information may include, for example, brand information, product information, trademark information, company identity (CI) information, feature point information and the like but is not limited thereto. Also, the input unit 101 may receive user inputs from a user. For example, the input unit 101 may receive a user input for selecting feature points with respect to a captured image.

In one aspect of the present invention, the input unit 101 may include a keypad, a dome switch, a touchpad (constant pressure/capacitance), a jog wheel, a jog switch and the like. Also, the input unit 101 may include a local area communication module (not shown). In this case, the input unit 101 may be configured to receive a user input that is input by an external console device. As a short range communication technology, Bluetooth, radio frequency identification (RFID), infrared data association (IrDA), ultra wideband (UWV), ZigBee and the like may be used.

For example, when the input unit 101 performs short range communication through IrDA, the external console device may be an infrared (IR) remote controller. Otherwise, when the input unit 101 performs short range communication using a Bluetooth function, the external console device may be a mobile device including a Bluetooth module. Here, the mobile device including a Bluetooth module may be, for example, a smart phone including a Bluetooth module.

The input unit 101 may receive a signal by sensing a key operation, a touch input or the like of a user or may receive a motion or a voice through the image capturing unit 109 or a microphone (not shown) to convert the same into an input signal. For this, well-known speech recognition technologies or motion recognition technologies may be used.

Also, the input unit 101 may be provided as an RFID tag reader, a barcode reader or the like. Accordingly, feature points or an original image of an object may be recognized by the database 111 that will be described through an RFID tag of the object recognized by the RFID tag reader. Feature points or an original image of an object may be recognized by the database 111 through a barcode of the object recognized by the barcode reader.

In one aspect of the present invention, when the input unit 101 is operated by a touch input, signal(s) corresponding to the touch input may be sent to the control unit 107. The control unit 107 may recognize which area of the input unit 101 is touched by processing the received signal(s).

The output unit 103 may provide a user interface (UI) at the image analysis apparatus 100. According to one aspect of the present invention, the output unit 103 may be configured to generate visual, auditory, or tactile outputs. The output unit 103 may display (output) information processed by the image analysis apparatus 100.

For example, the output unit 103 may output a captured image of an object. Also, the output unit 103 may output information related to a plurality of feature points predetermined with respect to the object. In one aspect of the present invention, a captured image of the object and information of the plurality of feature points predetermined with respect to the object may be output at the same time.

In addition, the output unit 103 may output data of a result of comparing the captured image with an original image. For example, the comparison result data may include a concordance rate between the captured image and the original image, whether it is genuine/counterfeit, a consumption rate of a product, an expected use time, a scale value of an analog instrument when the captured image corresponds to the analog instrument, a scale value displayed as a number at a digital instrument when the captured image corresponds to the digital instrument and the like but is not limited thereto.

In one aspect of the present invention, the output unit 103 may include at least one of a liquid crystal display (LCD), a thin film transistor-liquid crystal display (TFT-LCD), an organic light-emitting diode (OLED), a flexible display, and a 3D display. Some of them may be configured to be a transparent type or a light transmission type to look outside therethrough. These may be called transparent displays. As a representative example of the transparent displays, there is a transparent OLED (TOLED).

In an additional aspect of the present invention, depending on an implemented form of the image analysis apparatus 100, a plurality of output units may be present. In this case, for example, in the image analysis apparatus 100, the plurality of output units may be arranged on one side to be spaced apart or integrated or may be arranged on different sides, respectively. Also, in an additional aspect of the present invention, the output unit 103 may output, for example, an audio signal, a vibration signal and the like in addition to a video signal.

Selectively, in the present invention, the input unit 101 and the output unit 103 may be integrated as one component.

The selection unit 105 may select at least two feature points from the captured image of the object based on the information of the feature points output at the output unit 103. Here, a selection of the at least two feature points from the captured image of the object may be automatically performed by the selection unit 105 or may be performed after the selection unit 105 receives an input for selecting the at least two feature points from the captured image of the object. Usually, the selection of the at least two feature points may be automatically performed by the selection unit 105. However, when the input for selecting the at least two feature points is received from the input unit 101, the selection may be performed based thereon. The selection unit 105 may be integrated with the control unit 107 as one component.

The control unit 107 may generally control overall operations of the image analysis apparatus 100. For example, the control unit 107 may extract feature points of an original image prestored with respect to the object, corresponding to the selected feature points, from the database 111. Also, the control unit 107 may compare the captured image with the original image based on the selected feature points and the extracted feature points. In addition, the control unit 107 may calculate a concordance rate between the captured image and the original image and may additionally determine whether the object is a genuine or a counterfeit based on the concordance rate or may calculate a consumption rate of the object. Also, the control unit 107 may measure a scale value of an analog instrument when the capture image corresponds to the analog instrument based on the selected feature points and the extracted feature points. It will be described below with respect to FIG. 4. Also, the control unit 1055 may measure a scale value displayed as a number at a digital instrument when the capture image corresponds to the digital instrument based on the selected feature points and the extracted feature points. It will be described below with respect to FIG. 5.

In one aspect of the present invention, the control unit 107 may generate exemplary information with respect to predetermined feature points. The exemplary information may be generated based on object identification information that has been input.

Also, the control unit 107 may perform pattern recognition processing capable of recognizing signals input from the input unit 101 or the image capturing unit 109 as texts or images. Also, the control unit 107 may perform voice recognition or motion recognition processing.

The database 111 may store a program, a code, or a command for operations of the control unit 107 and may store input/output data. Also, the database 111 may store identification information of the object, feature point information of the captured image, original image information, feature point information of the original image and the like. Also, when the object is an analog instrument or a digital instrument, feature point information with respect to the analog instrument or the digital instrument may be prestored in the database 111. The feature point information with respect to the analog instrument or the digital instrument may include a reference image of the analog instrument or the digital instrument, positions of feature points in the reference image, and the number of feature points. In an additional aspect of the present invention, operations of the control unit 107 and the database 111 may be performed by a server (not shown). The server (not shown) may include a customhouse server but is not limited thereto. In this case, since the server and an image analysis apparatus (or a smart camera) may be configured to include transmission/reception units respectively, they may communicate with each other through a wired or wireless network. Also, the database 111 may store distance data and view angle data measured through the distance sensor 113 and image-capturing data captured through the image capturing unit 109. In an additional aspect of the present invention, such data may be transmitted to the server (the customhouse server) through the transmission/reception unit of the image analysis apparatus 100.

The database 111 may include at least one storage medium among a flash memory type memory, a hard disk type memory, a multimedia card micro type memory, a card type memory (for example, a secure digital (SD) memory, an extreme digital (XD) memory and the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk and the like. In an additional aspect of the present invention, the image analysis apparatus 100 may operate in relation to a web storage that performs a storage function of the database 111 on the Internet.

Additionally, the database 111 may be present outside the image analysis apparatus 100. In this case, the database 111 may be configured to be communicable with the image analysis apparatus 100.

The image capturing unit 109, as a selective component, may be disposed to directly capture the object. A picture frame (image) captured by the image capturing unit 109 may be stored in the database 111 or transmitted outward through a network. Two or more of such image capturing units 109 may be configured depending on a service environment. As necessary, the image capturing unit 109 may be configured to be disposed outside the image analysis apparatus 100 and be communicable with the image analysis apparatus 100.

In one aspect of the present invention, the distance sensor 113 may be configured to measure a distance between the object and the image analysis apparatus 100. In one aspect of the present invention, the image analysis apparatus 100 may include a plurality of distance sensors to measure distances from two or more spots on the object to the image analysis apparatus 100 respectively. Afterward, the control unit 107 may calculate tilt information of the object based on a plurality of such measured distances. Also, the control unit 107 may modify one of the captured image of the object and the original image to correspond to the other, based on the calculated tilt information.

Various embodiments described herein may be implemented in a recording medium readable by a computer or a similar apparatus using, for example, software, hardware, or a combination thereof.

According to hardware implementation, the embodiment described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for executing other functions. In some cases, the embodiments described herein may be implemented as the control unit 107.

According to software implementation, embodiments such as procedures and functions described herein may be implemented as separate software modules. Each of the software modules may perform one or more functions and operations described herein. Software codes may be implemented by software applications written by an adequate program language. The software codes may be stored in the database 111 and may be executed by the control unit 107.

Figure 2:
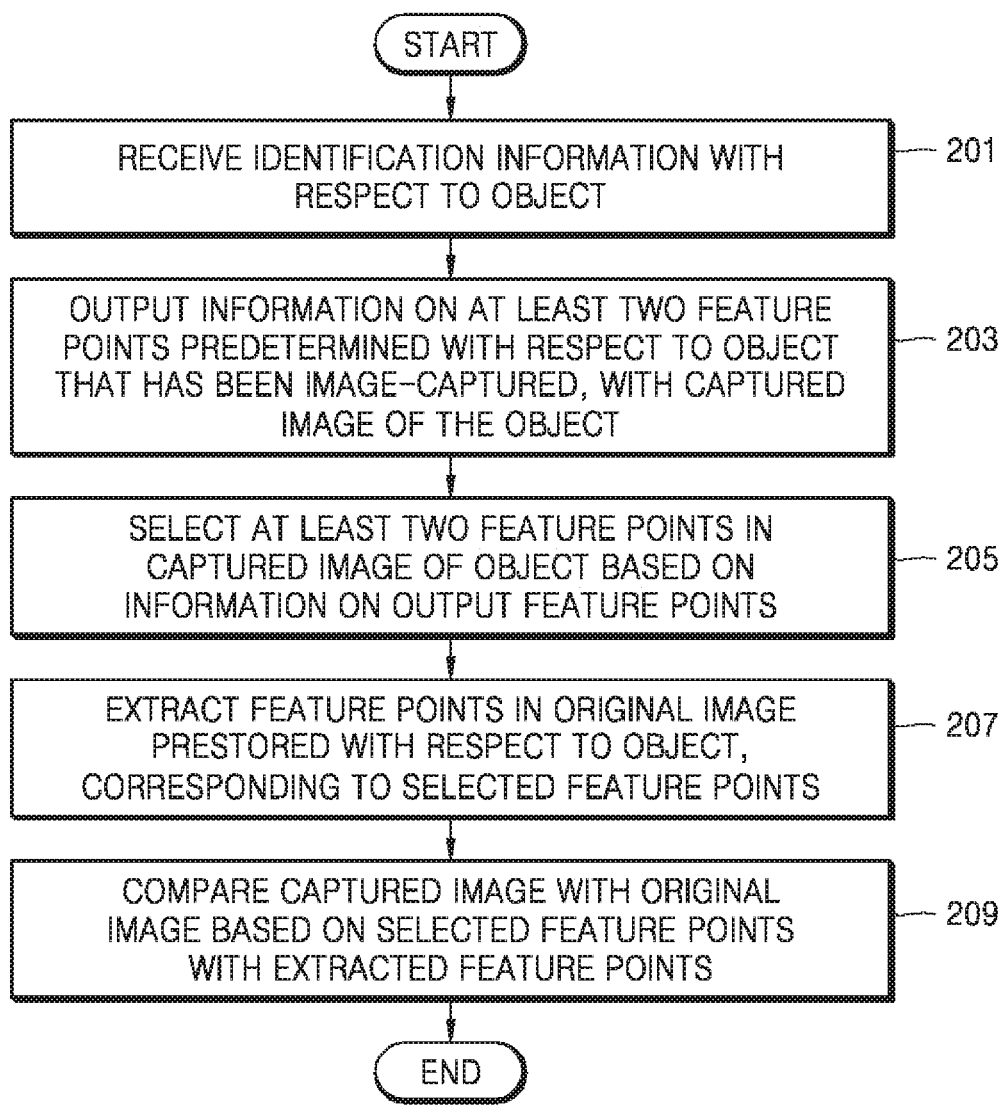
FIG. 2 is a flowchart illustrating an image analysis method performed by the image analysis apparatus according to one embodiment of the present invention.

FIG. 2 is a flowchart illustrating an image analysis method performed by the image analysis apparatus 100 according to one embodiment of the present invention.

As shown in FIG. 2, the image analysis apparatus 100 may receive identification information with respect to an object whose image will be captured (201). The identification information may include, for example, brand information, product information, trademark (logo) information, CI information, feature point information and the like but is not limited thereto. In one aspect of the present invention, feature point information such as positions of feature points related to a particular trademark and a particular product and the number of the feature points may be prestored in the database 111. Also, when the object is an analog instrument or a digital instrument, feature point information with respect to the analog instrument or the digital instrument may be prestored in the database 111. The feature point information with respect to the analog instrument or the digital instrument may include a reference image of the analog instrument or the digital instrument, positions of feature points in the reference image, and the number of feature points.

Afterward, although not shown in FIG. 2, the image analysis apparatus 100 may receive captured image data of the object.

When the image analysis apparatus 100 include the image capturing unit 109 therein, the captured image data may be stored in the database 111 or may be transferred to the control unit 107 and output at the output unit 103. That is, in this case, the image analysis apparatus 100 may directly capture an image of the object.

According to one aspect of the present invention, in capturing an image of an object, a size of an output image of the object may be changed according to a change in distance between the image capturing unit 109 and the object. Accordingly, in this case, based on a distance between the object and the image analysis apparatus 100 calculated by the distance sensor 113 of the image analysis apparatus 100, the control unit 107 may adjust a size of the object (for example, a size of the original image). In more detail, the distance between the image capturing unit 109 and the object may be measured using the distance sensor 113 and a size of one pixel of the captured image may be determined based on the measured distance. The image analysis apparatus 100 may change the size of the captured image based on the size of one pixel determined as described above.

In an additional aspect of the present invention, the image analysis apparatus 100 may include a plurality of distance sensors arranged at different positions. In this case, even though a capturing angle is tilted, a precise distance between the object and the image capturing unit 109 may be calculated by adjusting a difference in sensed distances between a first distance sensor and a second distance sensor.

Referring to FIG. 2 again, for example, when identification information that has been input is trademark information of a particular brand, feature point information that indicates feature points of the particular trademark stored in the database 111 may be output. Also, when identification information that has been input is feature point information of an analog instrument or the digital instrument, feature point information of the analog instrument or the digital instrument stored in the database 111 may be displayed and output. The feature point information of the analog instrument or the digital instrument may include a reference image of the analog instrument or the digital instrument, positions of feature points in the reference image, the number of the feature points and the like. Information on the feature points may be referred as indication information. The indication information may be output with the captured image of the object at the image analysis apparatus 100. That is, with the captured image of the object, information on a plurality of feature points predetermined with respect to the object that has been image-captured may be output.

In an additional aspect of the present invention, as described below with reference to FIG. 6, outputting the captured image of the object may include additionally processing the captured image of the object to emphasize a particular color of the object that has been image-captured. Accordingly, in this case, for example, when a tag of a particular color attached to indicate a caution or a warning in customs formalities or customs procedure is present in the captured image, the captured image may be image-processed to emphasize only the particular color and display other colors in achromatic color.

Afterward, referring to FIG. 2 again, the image analysis apparatus 100 may select at least two feature points from the output captured image of the object based on output information (that is, the indication information) of the feature points (205). In other words, the image analysis apparatus 100 may select at least feature points from the output image of the object based on the indication information. Here, a selection of the at least two feature points from the captured image of the object may be automatically performed by the image analysis apparatus 100 based on the indication information or may be performed after the image analysis apparatus 100 receives an input for selecting the at least two feature points from the captured image of the object from a user. Usually, the selection of the at least two feature points may be automatically performed by the image analysis apparatus 100. However, when the input for selecting the at least two feature points is received from the user, the selection may be performed based thereon.

After the feature points are selected, the image analysis apparatus 100 may extract feature points from the original image prestored with respect to the object, corresponding to the selected feature points, respectively (207). As described above, according to identification information of a certain object, positions of feature points, the number of the feature points, an original image, the number of feature points in the original image, positions of the feature points in the original image, and the like with respect thereto may be stored in the database 111. Accordingly, when the feature points of the captured image are inputted, the feature points in the original image corresponding thereto may be extracted from the database 111. In an additional aspect of the present invention, the original image may be processed to be a translucent shape and then may be output by the output unit 103 while being overlapped with the captured image of the object. That is, the original image may be processed to be translucent and the captured image of the object may be overlapped with the original image processed to be translucent to be output at the output unit 103.

Afterward, the image analysis apparatus 100 may compare the captured image with the original image based on the selected feature points and the extracted feature points (209). In one aspect of the present invention, the captured image and the original image may be compared based on distances between the selected feature points and the extracted feature points.

That is, when there are two selected feature points and two extracted feature points, a concordance rate between the capture image and the original image may be calculated based on a distance between the selected feature points and a distance between the extracted feature points. Here, the concordance rate between the captured image and the original image may be determined by a ratio of the distance between the selected feature points to the distance between extracted feature points. When the concordance rate between the captured image and the original image is equal to or higher than a set concordance rate, the image analysis apparatus 100 may determine that the object is genuine.

Also, the image analysis apparatus 100 may calculate a consumption rate of the object, a use period of the object, or an available period of the object using the concordance rate between the captured image and the original image. For this, it is necessary that the database 111 stores information on the consumption rate, the use period of the object, or the available period of the object according to the concordance rate (a value thereof) between the captured image and the original image.

In an additional aspect of the present invention, the image analysis apparatus 100 may calculate a tilt by comparing the selected feature points with the extracted feature points. Afterward, the image analysis apparatus 100 may modify one of the captured image and the original image to correspond to the other, based on the calculated tilt. Through this method, damageability in reliability of the concordance rate caused by a distortion of image-capturing may be reduced.

Figure 3:
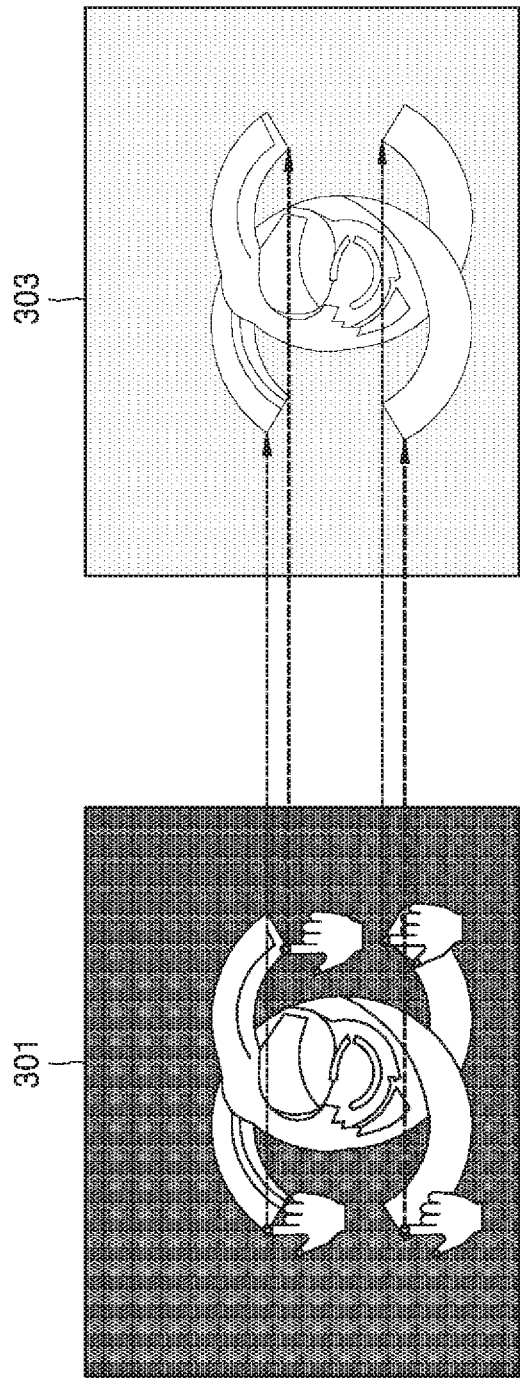
FIG. 3 illustrates one example of a method of comparing images in the image analysis apparatus.

FIG. 3 illustrates one example of a method of comparing images in the image analysis apparatus 100.

A captured image 301 may be output at the image analysis apparatus 100. As shown in FIG. 3, the image analysis apparatus 100 may select feature points (for example, a cursor in a finger shape) in the captured image 301 based on indication information (not shown) output with the captured image 301. In the case of an object shown in FIG. 3, the number of feature points may be predetermined to be four.

After the feature points are selected, feature points in an original image 303 corresponding to the selected feature points may be extracted. In one aspect of the present invention, the original image 303 and the feature points in the original image 303 may not be output at the output unit 103 of the image analysis apparatus 100 and may be processed through communication between the database 111 and the control unit 107.

In the example shown in FIG. 3, the number of the feature points may be four and the four feature points may totally have six feature point pairs. Accordingly, distances between feature points of each of the six feature point pairs in the captured image and the original image are calculated in such a way that the distance between the feature points of each pair may be digitized to be compared.

Figure 4:
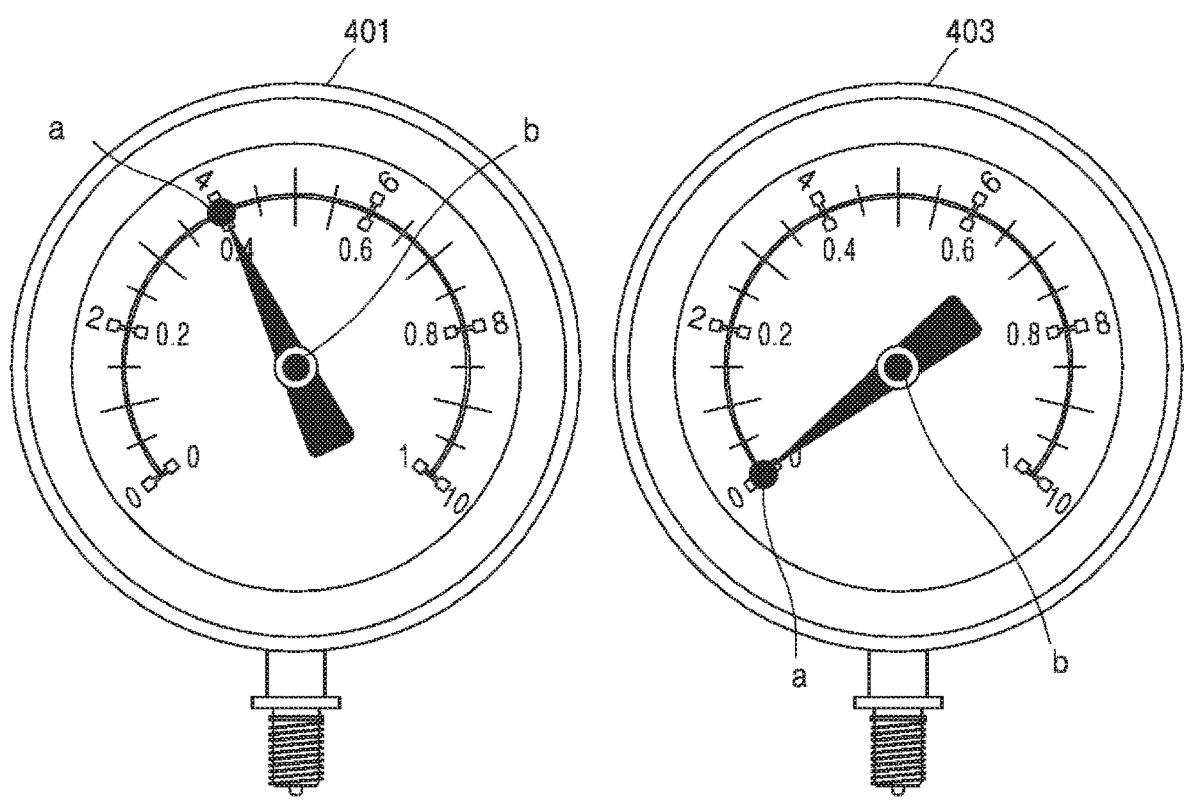
FIG. 4 illustrates another example of a method of comparing images in the image analysis apparatus.

FIG. 4 illustrates another example of a method of comparing images in the image analysis apparatus 100.

A captured image 401 may be output at the image analysis apparatus 100. As shown in FIG. 4, the image analysis apparatus 100 may select feature points (for example, a cursor in a circular shape) in the captured image 401 based on indication information (not shown) output with the captured image 401. In the case of an object (for example, an analog pressure instrument) shown in FIG. 4, the number of feature points a and b may be predetermined to be two.

After the feature points are selected, feature points in an original image 403 (a reference image of the analog instrument) corresponding to the selected feature points may be extracted. In one aspect of the present invention, the original image 403 and the feature points in the original image 403 may not be output at the output unit 103 of the image analysis apparatus 100 and may be processed through communication between the database 111 and the control unit 107.

In the case of the example of FIG. 4, there are two feature points a (a variable point) and b (a reference point) on a needle. A scale value (for example, a pressure value) of the analog pressure instrument may be recognized using a change in position of the feature point a (the variable point). For this, it is necessary that the database 111 stores a scale value (a pressure value) corresponding to the position of the feature point a (the variable point).

Figure 5:
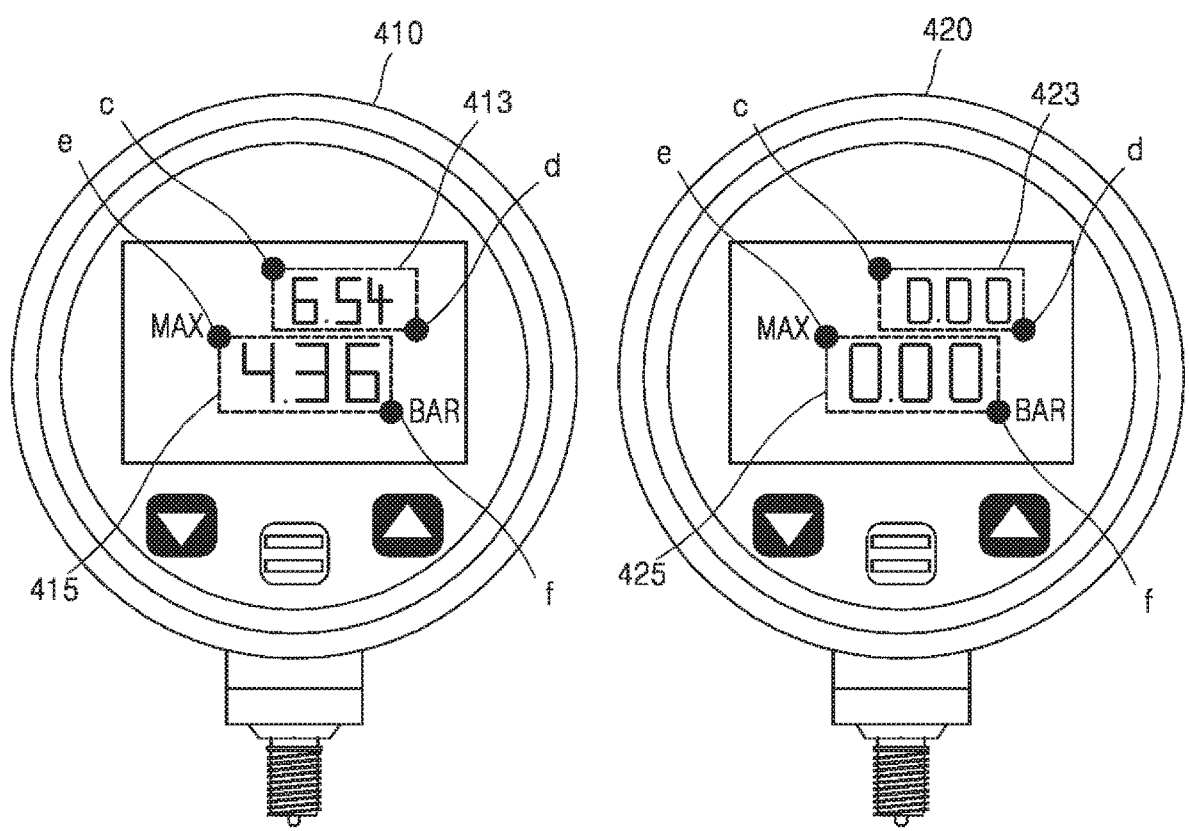
FIG. 5 illustrates still another example of a method of comparing images in the image analysis apparatus.

FIG. 5 illustrates still another example of a method of comparing images in the image analysis apparatus 100.

A captured image 410 may be output at the image analysis apparatus 100. As shown in FIG. 5, the image analysis apparatus 100 may select feature points (for example, a cursor in a circular shape) in the captured image 410 based on indication information (not shown) output with the captured image 410. In the case of an object (for example, a digital pressure instrument) shown in FIG. 5, the number of feature points c, d, e, and f may be predetermined to be four. Here, the feature points e and f are for generating a measured pressure area 415 for displaying a measured pressure and the feature points c and d are for generating a maximum measured pressure area 413 for displaying a maximum pressure of the object. As described above, when coordinates of two points are known, the maximum measured pressure area 413 and the measured pressure area 415 may be checked.

After the feature points are selected, feature points in an original image 420 (a reference image of the digital pressure instrument) corresponding to the selected feature points may be extracted. In one aspect of the present invention, the original image 420 and the feature points in the original image 403 may not be output at the output unit 103 of the image analysis apparatus 100 and may be processed through communication between the database 111 and the control unit 107.

In the case of the example of FIG. 5, there are present the feature points c and d for generating a maximum measured pressure area 423 and the feature points e and f for generating a measured pressure area 425. The maximum measured pressure area 423 and the measured pressure area 425 are areas including a maximum measured pressure value and a measured pressure value respectively and may be recognized through image processing. Since the image processing is a well-known technology, a description thereof will be omitted. For this, it is necessary that the database 111 stores an initial value of maximum measured pressure and an initial value of measured pressure. In the case of the example of FIG. 5, the initial value of the maximum measured pressure is 0.00 [bar] and the initial value of the measured pressure is 0.00 [bar]. However, it is merely an example and the present invention is not limited thereto.

In an additional aspect of the present invention, image sizes of an original image and a captured image may be mutually matched through a single distance measurement sensor. In more detail, the sizes of the original image and the captured image may be matched with each other using the single distance measurement sensor and then the captured image and the original image may be compared with each other. That is, tilt information of the object may be adjusted or the original image and the captured image may be compared (when it is unnecessary to adjust the tilt information) by comparing at least two feature points of the captured image with at least two feature points of the original image through a measured distance value between the two spots (on a display) and an angle value between the two spots. Also, comparison between the feature points may be performed by coordinating each of the captured image and the original image by pixel to configure pixel point blocks and comparing the both images by the configured pixel point block unit. That is, differences in image patterns such as colors, positions, and sizes of images) between the original image and the captured image may be compared in detail by a predetermined pixel block unit. In one aspect of the present invention, the operations described above may be performed by the control unit 107 of the image analysis apparatus 100.

Accordingly, through the comparison method described above, a concordance rate between the original image and the captured image may be calculated. In addition, based on the concordance rate calculated as described above, whether the object that has been image-captured is genuine/counterfeit, the consumption rate of the object, an available use period of the object and the like may be determined.

In another aspect of the present invention, in selecting feature points of the object, when positions of predetermined feature points are selected, the selected positions are displayed while being enlarged to allow the precise positions of the feature points to be selected or adjusted. Otherwise, when positions of predetermined feature points area selected, the selected positions are enlarged to allow the precise positions of the feature points to be more adjusted. For example, such adjustment may be automatically performed by the control unit 107 of the image analysis apparatus 100 based on the positions of the predetermined feature points.

Figure 6:
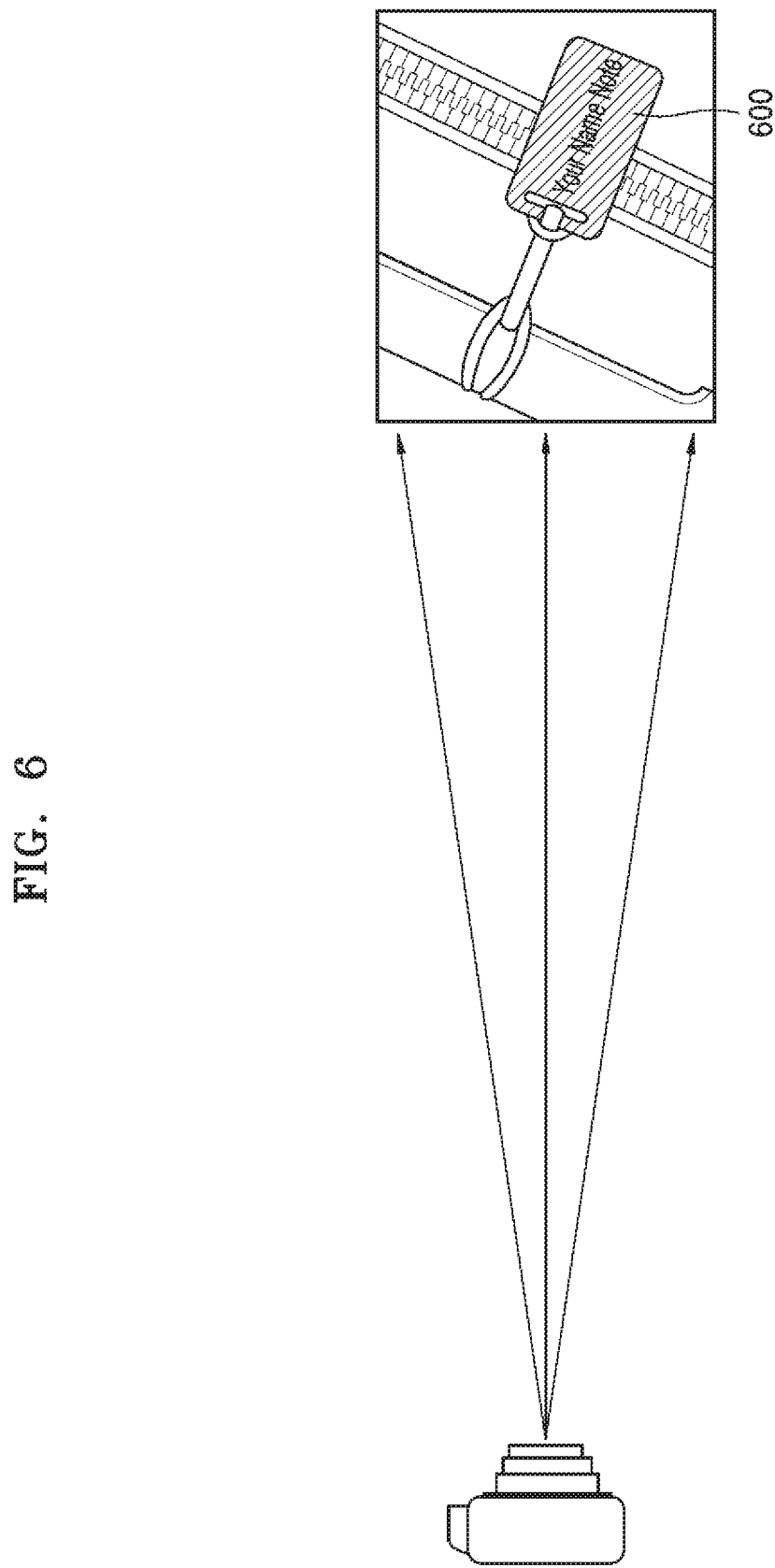
FIG. 6 illustrates an exemplary image processing method according to a further embodiment of the present invention.

FIG. 6 illustrates an exemplary image processing method according to a further embodiment of the present invention.

As shown in FIG. 6, when an image of an object has a particular target color is captured, the image analysis apparatus 100 may image-process other colors except the corresponding target color into achromatic colors or may image-process the object that has the corresponding target color (for example, a tag) to be better displayed. In FIG. 6, the object that has the target color is displayed as consecutive slashes 60, and the slash part may indicate the target color and may be yellow but is not limited thereto. In an additional aspect of the present invention, a camera (or a smart camera) shown in FIG. 6 may correspond to the image analysis apparatus 100.

Accordingly, since a particular target colored tag including a message such as a caution, a warning and the like during a customs procedure or customs formalities may be emphasized, it is possible to target a particular object using a quick and efficient method. In addition, an object with a tag having a particular color may undergo a different authentication procedure different from those of other objects. Accordingly, it is possible to easily exclude a deception or misrecognition in authenticating or verifying the object.

Figure 7:
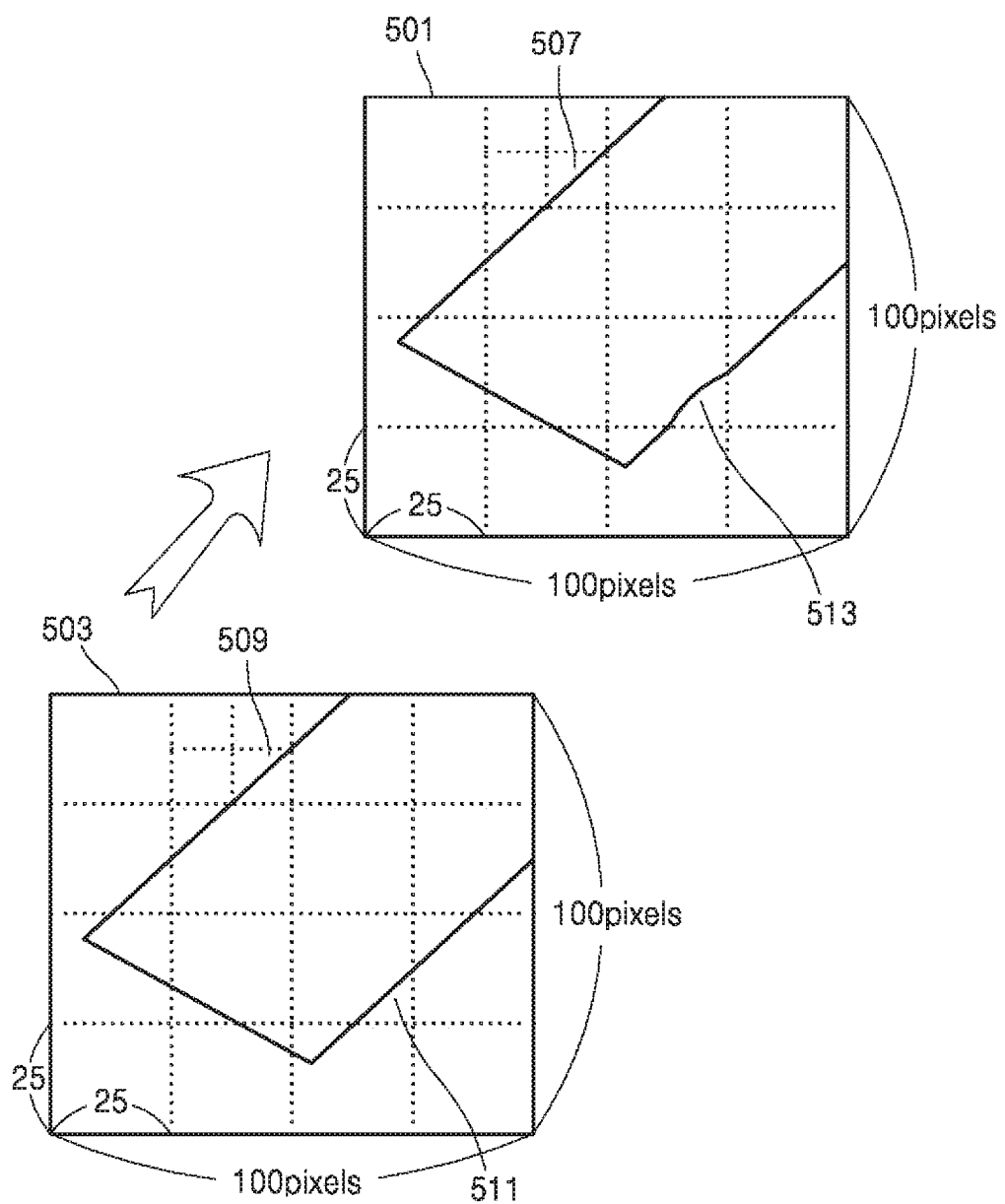
FIG. 7 illustrates a method of comparing images using the exemplary image processing method according to a further embodiment of the present invention.

FIG. 7 illustrates a method of comparing images using the exemplary image processing method according to a further embodiment of the present invention.

According to one aspect of the present invention, an original image 503 and a captured image 501 may be compared based on pixel point blocks. As shown in FIG. 7, sizes of the original image and the captured image are matched with each other through a (single) distance measurement sensor and pixel point blocks by 25 pixel units may be displayed with an image.

FIG. 7 illustrates enlarged images of left upper parts of the images of FIG. 3. As shown in FIG. 7, a concordance rate between the original image and the captured image may be digitized and calculated through image comparison by pixel block units. In one aspect of the present invention, as shown in FIG. 7, pixel blocks 507, 509, 511, and 513 corresponding to the captured image 501 and the original image 503 may be compared with one another. Since there are differences in thicknesses and positions of lines when particular parts 507 and 513 of the captured image 501 are compared with corresponding parts 509 and 511 of the original image 503, a concordance between the both images may be calculated based thereon.

Additionally, although pixel point blocks of 25 pixel units has been described as an example with reference to FIG. 6, it will be obvious that various shaped pixel point blocks may be configured.

A description of the disclosed embodiments is provided to allow one of ordinary skill in the art to use or implement the present invention. Various modifications of the embodiments will be obvious to one of ordinary skill in the art, and general principles defined herein will be applied to other embodiments without departing from the scope of the present invention. Accordingly, the present invention will not be limited to the embodiments disclosed herein and should be understood within the broadest range consistent with principles and novel features provided herein.

INDUSTRIAL APPLICABILITY

The present invention may be used for a technology of analyzing a captured image and an original image.

The invention claimed is:

1. An image analysis method performed by an image analysis apparatus, the method comprising:
measuring a distance between an object and the image analysis apparatus;
outputting, using an output unit comprising a display, a captured image of the object with information on feature points predetermined with respect to the object that has been image-captured;
selecting at least two feature points in the captured image of the object based on the information on output feature points;

calculating a relative size of an original image prestored with respect to the object based on the measured distance;
extracting, from a database, feature points in the original image corresponding to each of the selected at least two feature points and stored in the database, based on the calculated relative size;
comparing the captured image of the object with the original image based on distances between the selected feature points and the extracted feature points; and
calculating a concordance rate between the original image and the captured image through pixel block-level image comparison by matching sizes of the original and captured images with each other and comparing pixel blocks corresponding to the captured image and the original image with one another,
wherein the comparing of the captured image with the original image comprises processing the original image to be translucent and overlapping the processed original image with the captured image to compare the same.

2. The method of claim 1, wherein the selection of the at least two feature points in the captured image of the object is automatically performed or is performed after receiving an input for selecting the at least two feature points in the captured image of the object.

3. The method of claim 1, wherein the concordance rate is calculated by a ratio of a distance between two selected feature points to a distance between two extracted feature points.

4. The method of claim 3, further comprising determining whether the object is genuine, based on the calculated concordance rate,
wherein the object is genuine when the calculated concordance rate is equal to or higher than a set concordance rate.

5. The method of claim 3, further comprising calculating a consumption rate of the object based on the calculated concordance rate.

6. The method of claim 1, further comprising measuring a scale value of an analog instrument based on the comparison when the captured image of the object is an image of the analog instrument.

7. The method of claim 1, further comprising measuring a number displayed in an image of a digital instrument based on the comparison when the captured image of the object is the image of the digital instrument.

8. The method of claim 1, wherein the information on the at least two feature points predetermined with respect to the object that has been image-captured is generated based on identification information of the object.

9. The method of claim 1, wherein the comparing comprises:
measuring a distance between each of two or more spots on the object;
calculating a tilt of the object based on a plurality of such measured distances; and
modifying one of the captured image and the original image to correspond to the other based on the calculated tilt.

10. The method of claim 1, wherein the outputting of the captured image of the object comprises additionally processing the captured image of the object to emphasize a particular color of the object that has been image-captured.

11. An image analysis apparatus comprising:
a distance sensor configured to measure a distance between an object and the image analysis apparatus;
an output unit comprising a display configured to:
output a captured image of the object with output information on feature points predetermined with respect to the object that has been image-captured; and
a controller configured to:
select at least two feature points in the captured image of the object based on the information on output feature points,
calculate a relative size of an original image prestored with respect to the object based on the measured distance,
extract, from a database, feature points in the original image corresponding to each of the selected at least two feature points and stored in the database, based on the calculated relative size,
compare the captured image of the object with the original image based on distances between the selected feature points and the extracted feature points; and
calculate a concordance rate between the original image and the captured image through pixel block-level image comparison by matching sizes of the original and captured images with each other and comparing pixel blocks corresponding to the captured image and the original image with one another.

12. The apparatus of claim 11, wherein the selection of the at least two feature points in the captured image of the object is automatically performed or is performed after receiving an input for selecting the at least two feature points in the captured image of the object.

13. The apparatus of claim 11, wherein the concordance rate is calculated by a ratio of a distance between two selected feature points to a distance between two extracted feature points.

14. The apparatus of claim 11, wherein the controller measures a scale value of an analog instrument based on the comparison when the captured image of the object is an image of the analog instrument.

15. The apparatus of claim 11, wherein the controller processes the original image to be translucent and overlaps the original image processed to be translucent with the captured image of the object to compare the same.

16. The apparatus of claim 11, wherein the output unit comprising a display emphasizes and outputs a particular color of the object that has been image-captured.

17. A non-transitory computer-readable medium in which instructions for allowing an image analysis apparatus to perform following operations are stored, wherein the operations comprise:
measuring a distance between an object and the image analysis apparatus;
outputting, using an output unit comprising a display, a captured image of the object with information on feature points predetermined with respect to the object that has been image-captured;
selecting at least two feature points in the captured image of the object based on the information on output feature points;
calculating a relative size of an original image prestored with respect to the object based on the measured distance;
extracting, from a database, feature points in the original image corresponding to each of the selected at least two feature points and stored in the database, based on the calculated relative size;

comparing the captured image of the object with the original image based on distances between the selected feature points and the extracted feature points; and calculating a concordance rate between the original image and the captured image through pixel block-level image comparison by matching sizes of the original and captured images with each other and comparing pixel blocks corresponding to the captured image and the original image with one another.

18. The non-transitory computer-readable medium of claim 17, wherein the selection of the at least two feature points in the captured image of the object is automatically performed or is performed after receiving an input for selecting the at least two feature points in the captured image of the object.

19. The non-transitory computer-readable medium of claim 17, wherein the comparing of the captured image of the object with the original image based on the selected feature points and the extracted feature points comprises:

processing the original image to be translucent; and overlapping the original image processed to be translucent with the captured image of the object to compare the same.

20. The non-transitory computer-readable medium of claim 17, wherein the outputting of the captured image of the object is performed while a particular color of the captured image is emphasized.

21. An inspection system comprising:

a smart camera for determining whether an object is genuine; and a server for communicating with the smart camera through a wired or wireless network, wherein the smart camera is configured to:

measure a distance between the object and the smart camera;

output a captured image of the object with information on feature points predetermined with respect to the object that has been image-captured;

select at least two feature points in the captured image of the object based on the information on output feature points; and a transmission/reception unit configured to communicate with the server, wherein the smart camera is further configured to transmit information on the measured distance and information on the selected feature points to the server, and wherein the server is configured to:

calculate a relative size of an original image prestored with respect to the object based on distance information received from the smart camera, extract, from a database, feature points in the original image corresponding to each of the at least two feature points received from the smart camera and stored in the database, based on the calculated relative size, compare the captured image of the object with the original image based on distances between the selected feature points and the extracted feature points, calculate a concordance rate between the original image and the captured image through pixel block-level image comparison by matching sizes of the original and captured images with each other and comparing pixel blocks corresponding to the captured image and the original image with one another, and transmit comparison data obtained by the comparison to the smart camera, wherein the server is further configured to process the original image to be translucent and overlap the processed original image with the captured image to compare the same.

22. The system of claim 21, wherein the selection of the at least two feature points in the captured image of the object is automatically performed or is performed after receiving an input for selecting the at least two feature points in the captured image of the object.

23. The system of claim 21, wherein the smart camera emphasizes and outputs a particular color of the object that has been image-captured.

* * * * *